US012663870B2

(12) United States Patent
Themelis

(10) Patent No.: US 12,663,870 B2
(45) Date of Patent: Jun. 23, 2026

(54) DEVICES AND METHODS FOR CONTACTLESS HAPTIC CONTROL

(71) Applicant: Leica Instruments (Singapore) Pte. Ltd., Singapore (SG)

(72) Inventor: George Themelis, Singapore (SG)

(73) Assignee: LEICA INSTRUMENTS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/761,348

(22) Filed: Jul. 2, 2024

(65) Prior Publication Data

US 2025/0021163 A1 Jan. 16, 2025

(30) Foreign Application Priority Data

Jul. 10, 2023 (EP) ..................................... 23184522

(51) Int. Cl.
*G06F 3/01* (2006.01)
*G06F 3/0362* (2013.01)

(52) U.S. Cl.
CPC .............. *G06F 3/016* (2013.01); *G06F 3/011* (2013.01); *G06F 3/017* (2013.01); *G06F 3/0362* (2013.01)

(58) Field of Classification Search
CPC .......... G06F 3/016; G06F 3/011; G06F 3/017; G06F 3/0362; G06F 3/0304; G06F 3/04847; A61B 2017/00207
See application file for complete search history.

(56) References Cited

U.S. PATENT DOCUMENTS

| | | | | | |
|---|---|---|---|---|---|
| 10,403,084 | B2 * | 9/2019 | Froy | ................... | G07F 17/3209 |
| 10,492,986 | B2 * | 12/2019 | Giacometti | .......... | A61H 31/005 |
| 10,732,721 | B1 * | 8/2020 | Clements | ................ | B66B 1/468 |
| 11,048,329 | B1 * | 6/2021 | Lee | .......................... | G06F 3/011 |
| 2016/0246374 | A1 * | 8/2016 | Carter | ...................... | G08B 6/00 |
| 2017/0153707 | A1 * | 6/2017 | Subramanian | .......... | G06F 3/011 |
| 2017/0220112 | A1 * | 8/2017 | Nakamura | ........... | B06B 1/0611 |
| 2017/0221323 | A1 * | 8/2017 | Nakamura | .............. | G06F 3/016 |
| 2017/0293259 | A1 * | 10/2017 | Ochiai | ................. | G02B 3/0006 |
| 2018/0047259 | A1 * | 2/2018 | Carter | .................... | G10K 15/00 |
| 2018/0210551 | A1 * | 7/2018 | Kitagawa | ............ | G06F 3/04847 |
| 2019/0021924 | A1 * | 1/2019 | Trepanier | ............... | A61B 5/746 |
| 2019/0029769 | A1 * | 1/2019 | Martin | ................... | A61B 34/25 |

(Continued)

FOREIGN PATENT DOCUMENTS

| | | | | | |
|---|---|---|---|---|---|
| AU | 2017376111 | A1 * | 4/2019 | ............. | G16H 40/67 |
| CN | 104049739 | A * | 9/2014 | ............. | G06F 3/011 |

(Continued)

*Primary Examiner* — William Lu
(74) *Attorney, Agent, or Firm* — LEYDIG, VOIT & MAYER, LTD.

(57) ABSTRACT

A human system interface (HSI) for contactlessly controlling a device for a medical procedure is configured to generate a control space, measure a position of a user in the control space, provide a first contactless haptic stimulus in the control space to the user based on the measured position, measure a contactless haptic input from the user in the control space, provide a second haptic stimulus to the user depending on the contactless haptic input, and, based on the contactless haptic input, change a parameter of the HSI and/or provide a parameter to the device connected to the HSI.

15 Claims, 3 Drawing Sheets

(56)     References Cited

U.S. PATENT DOCUMENTS

| | | | | |
|---|---|---|---|---|
| 2019/0231430 A1* | 8/2019 | Friman | .................. | A61B 90/36 |
| 2019/0235630 A1* | 8/2019 | Verbeke | ............... | G06F 9/3004 |
| 2020/0330303 A1* | 10/2020 | Kostic | ................ | G06F 3/04886 |
| 2020/0357176 A1* | 11/2020 | Crowther | ............... | G06F 3/011 |
| 2021/0005110 A1* | 1/2021 | Stone | ................... | G09B 19/003 |
| 2021/0018985 A1* | 1/2021 | Verbeke | .............. | H04N 9/3179 |
| 2022/0011870 A1* | 1/2022 | Nakaya | .................... | A61L 2/10 |
| 2022/0148723 A1* | 5/2022 | Ramachandran | ...... | G16H 50/20 |
| 2022/0293014 A1* | 9/2022 | Fisher | ................. | G09B 23/285 |
| 2022/0387724 A1* | 12/2022 | Helmer | .................. | A61M 5/20 |
| 2023/0029639 A1* | 2/2023 | Ghosh Roy | ............. | A61B 5/01 |

FOREIGN PATENT DOCUMENTS

| | | | | | | |
|---|---|---|---|---|---|---|
| CN | 104679234 A | * | 6/2015 | .............. | G08B 6/00 |
| CN | 118678920 A | * | 9/2024 | .......... | G06T 7/0014 |
| WO | WO-2024240812 A1 | * | 11/2024 | ............. | G06F 3/017 |

* cited by examiner

500

510

520

530

540

550

600

610

620

DEVICES AND METHODS FOR CONTACTLESS HAPTIC CONTROL

CROSS REFERENCE TO RELATED APPLICATIONS

This application claims benefit to European Patent Application No. EP 23184522.3, filed on Jul. 10, 2023, which is hereby incorporated by reference herein.

FIELD

This disclosure relates to devices and methods for performing contactless haptic control of a device, in particular a medical device, such as a microscope. Additionally a medical device, such as a microscope, is disclosed that comprises or interfaces with a device for contactless haptic control or which is configured for performing a method for contactless haptic control.

BACKGROUND

Contactless haptic feedback comprises provision of tactile sensations without physical contact. Various technologies have been explored, including ultrasound-based systems that create virtual touch sensations on the skin by stimulating mechanoreceptors. Other approaches involve electrical stimulation of the skin to produce a haptic sensation. These advancements aim to enhance user experiences in virtual reality, gaming, and human-computer interaction by providing a realistic sense of touch without the need for physical contact.

Clinical or medical procedures, such as surgeries, can be complex operations in which a human, e.g. a surgeon, can face a variety of different tasks to handle the involved medical equipment such as microscopes or other medical or clinical devices. The control of these devices still requires mechanical interaction of the medical personnel, i.e. the user, with the medical or clinical device. This can lead to an unnecessary cognitive load of the user and further bears the risk that the user is contaminated with germs and bacteria. Improvements in these areas are desirable.

SUMMARY

In an embodiment, the present disclosure provides a human system interface (HSI) for contactlessly controlling a device for a medical procedure. The HSI is configured to at least generate a control space, measure a position of a user in the control space, provide a first contactless haptic stimulus in the control space to the user based on the measured position, measure a contactless haptic input from the user in the control space, provide a second haptic stimulus to the user depending on the contactless haptic input, and based on the contactless haptic input, change a parameter of the HSI and/or provide a parameter to the device connected to the HSI.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
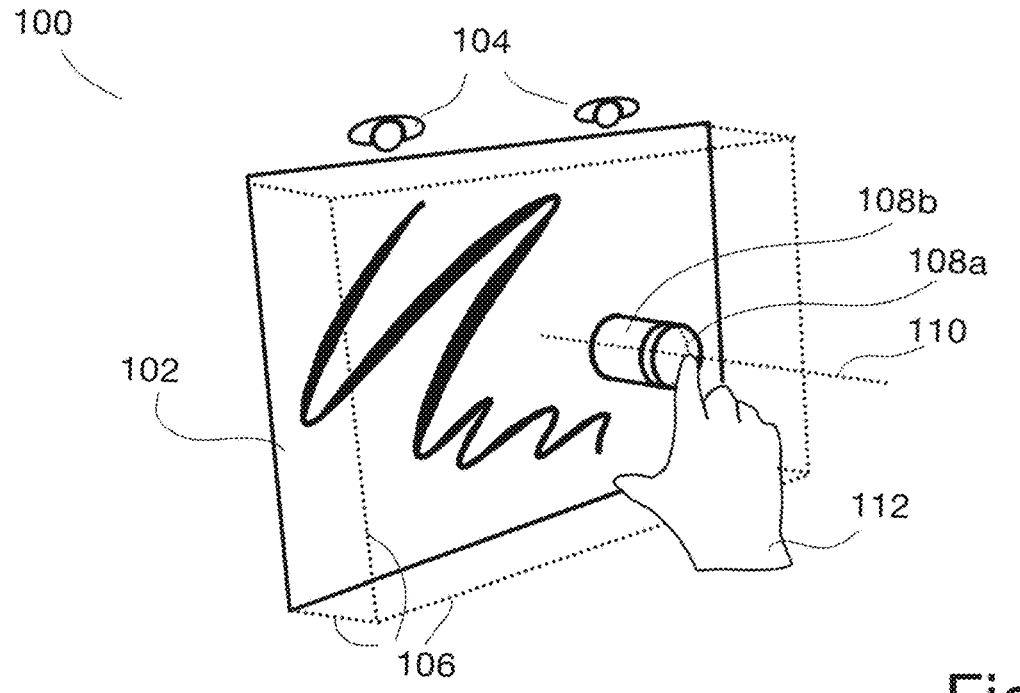
FIG. 1 illustrates a human system interface (HSI) for contactless haptic control according to an embodiment of this present disclosure.

Embodiments of the present disclosure provide improvements of a user interaction with a device, and in particular embodiments with a clinical or medical device and/or within a clinical or medical procedure.

A first aspect is related to a human system interface (HSI) for contactless controlling a device, in particular for a medical procedure, configured to:

generate a control space;

measure a position of a user, in particular a user's hand, in the control space;

provide a first contactless haptic stimulus in the control space to the user based on the measured position;

measure a contactless haptic input from the user in the control space;

provide a second haptic stimulus to the user depending on the haptic input; and based on the haptic input, change a parameter of the HSI and/or provide a parameter to a device connected to the HSI.

A Human System Interface (HSI) refers to a device for interaction between a human (sometimes also called operator) and an operated hardware and/or software technology. It can allow the user to control and monitor the operated technology effectively. A purpose of an HSI is to facilitate a seamless and intuitive interaction between a human user and an operated technology in particular in complex environments, such as clinical and/or medical environments.

HSIs can play an important role in clinical and/or medical procedures by facilitating communication and control between healthcare personnel and complex clinical or medical systems. HSIs, such as touchscreens, graphical interfaces, and control panels, allow clinical/medical personnel to input commands, monitor vital signs, adjust settings, and access patient data during surgeries, diagnostic procedures, or medical equipment operation. In the following the term "medical" can relate to analytical, clinical, healthcare-related, and/or medical topoi.

A user can interact with an HSI either directly or indirectly. In a direct interaction the user interacts with the HSI with its body, e.g., with one or more fingers, one or both hands, palms, arms, and/or the head.

An indirect interaction means that a user interacts with the HSI by a means, such as a pencil, a stick, a glove, etc. For the sake of brevity all these kinds of direct or indirect interactions are referred to as user interactions.

A control space in the sense of this disclosure is a space in which the HSI is effective. That means a control space is a space where a user can be observed by the HSI. Additionally or alternatively, a control space can be a space where a user can be stimulated by haptic feedback by the HSI. A generation of a control space is therefore based on the HSI's sensors and/or haptic actuators. A control space can be 1-, 2-, or 3-dimensional.

A measurement of a position of a user relates to registering a user, e.g. a user's hand, in the control space. A position can be derived directly, by measuring an absolute or relative position, and/or indirectly, by measuring a parameter and by determining a position based on the measured parameter.

A provision of a first haptic control stimulus can be related to a state in which a human-system interaction can begin. The first haptic stimulus can inform the user that the HSI has registered him. Additionally or alternatively, the first haptic stimulus can be used by the HSI to inform the user that further movements, i.e., changes in the measured position, can result in an interaction with device connected to the HSI or a feature of the HSI, such as a knob. The first haptic stimulus can be exerted to the part of the user whose position is measured. Additionally or alternatively, it can be provided to a different part of the user.

A measurement of a contactless haptic input by a user can be based on a measurement of a change in a position-based quantity of a part of a user, i.e. a change of a position of a user's finger with which the connected device and/or the HSI should be controlled.

A second haptic stimulus can be provided to display to the user an interaction of the user with the connected device and/or with the HSI. Usually, a second haptic stimulus can be provided with the same means as the first haptic stimulus. Additionally or alternatively a second haptic stimulus can be provided with a different haptic input means. The second haptic stimulus can be exerted to the part of the user whose position is measured. Additionally or alternatively, it can be provided to a different part of the user. In particular embodiments, the second haptic stimulus can be exerted to the same part of the user, e.g. a finger or a palm, to which the first haptic stimulus is exerted.

A parameter provided to a device connected to the HSI can comprise the haptic control information that is provided by the user and/or the user interaction with the HSI. The parameter can be a variable or factor that can be adjusted or manipulated to influence the behavior, performance, and/or outcome of a device connected to the HSI and/or any process that is executed by the connected device. The selection of the parameters will depend on the nature of the connected system and/or process which is to be controlled by the user.

An HSI according to the first aspect can improve a user interaction and experience by combining contactless haptic sensing and contactless haptic feedback for controlling a connected device and/or the HSI itself.

An embodiment of the first aspect is related to a human system interface (HSI), comprising one or more of the following sensors to measure the haptic input:
    a camera;
    an accelerometer; and/or
    an optical position tracker.
To measure a user position and/or a haptic input, i.e. a part of a body and/or of a human guided means, a position of one or more cameras or of optical trackers can be selected with a location such that the camera-system has a clear view of the area where the haptic input will occur. To facilitate recognition a user can wear markers, e.g. attached to gloves. In case of a surgeon, these markers can be, e.g., one or more colored fingertips of surgical gloves. In case of an accelerometer, this can be mounted at the part of the user that should be measured. An accelerometer can also be incorporated in (surgical) gloves, for example. To obtain an accurate result, position-based data of a plurality of sensors can be integrated.

Markers and/or accelerometers or other means for detection of position-based information can be incorporated in wearable devices, such as a glove and/or a bracelet. Based on a suitable sensor for haptic input a haptic input can be obtained with a sufficient resolution.

An embodiment of the first aspect is related to a human system interface (HSI), comprising one or more of the following actuators to provide the contactless haptic stimulus within the control space to the user:
    an ultrasound-based actuator;
    a laser-based actuator;
    a magnetic-field-based actuator;
    an air-vortex-based actuator;
    a glove-based actuator;
    an exoskeleton-based actuator; and/or
    a vibro-tactile actuator.
An ultrasound-based actuator can provide contactless haptic stimuli by ultrasound waves that generate tactile sensations or haptic feedback on a user's skin without the need for physical contact. The ultrasound actuator generates high-frequency sound waves, typically above the audible range (>20 kHz). These sound waves can be produced by piezoelectric transducers that convert electrical energy into mechanical vibrations. The generated ultrasound waves can be focused into a narrow beam directed towards the user's skin, e.g. the skin of a fingertip or palm of a hand. This focusing can be achieved using various techniques, such as phased ultrasound actuator arrays. When the focused ultrasound beam interacts with the skin, it can create a force. The force exerted by the ultrasound waves causes localized vibrations on the skin's surface, creating a perception of haptic feedback. Different haptic sensations can be created by changing various parameters of the ultrasound, including intensity, frequency, duration, and/or spatial distribution. By manipulating these parameters, different types of tactile sensations, such as textures, vibrations, or pressure, can be generated. Ultrasound-based haptic feedback has several advantages, including the ability to create virtual or simulated tactile sensations without physical contact, precise control over the generated sensations, and the potential for creating localized and detailed haptic effects.

A laser-based actuator utilizes laser beams to create localized thermal and/or pressure effects on the skin, creating a haptic stimulus. Therefore, a laser source can be used to generate a focused laser beam. The laser beam can be in the visible or infrared spectrum, depending on the specific application and desired effects. The laser beam can be focused into a small or larger spot using lenses or optical systems. The size and shape of the spot can be adjusted based on the desired haptic effect and the target area on the skin. When the focused laser beam interacts with the skin, it can create a localized thermal effect. The laser energy is absorbed by the skin, leading to a rapid increase in temperature in the targeted region. This temperature change can activate thermal receptors in the skin, resulting in the perception of warmth or heat-related haptic feedback. In addition to the thermal effect, the laser beam can also induce a rapid expansion of the skin due to the creation of an acoustic wave. This expansion can generate a pressure wave that stimulates the mechanoreceptors in the skin, creating a tactile sensation, i.e. haptic feedback. The laser parameters, such as power, duration, and spot size, can be controlled and modulated to create different haptic sensations. By varying these parameters, a range of tactile sensations, including pressure, vibration, or textures, can be generated.

A magnetic field-based actuator can comprise a coil of wire and/or a magnet and/or ferromagnetic material. When an electric current passes through the coil, it generates a magnetic field. The interaction between this magnetic field and the magnet or ferromagnetic material creates forces that produce haptic feedback. By controlling the current in the coil, the intensity and direction of the haptic feedback can be modulated.

An air-vortex-based actuator can generate haptic feedback by creating directed pulses or streams of air that interact with the user's skin. These air vortexes can produce tactile sensations on the skin surface, simulating touch or haptic feedback. An air-vortex-based actuator consists of a chamber or nozzle connected to a controlled air supply system. The air supply system releases bursts of compressed air into the chamber or nozzle. The generated vortex burst travels through the air towards the user's skin. The haptic stimulus can be controlled and modulated by adjusting various parameters, such as velocity, size, and frequency of the vortex bursts. By manipulating these parameters, different haptic sensations can be created, including taps, strokes, or vibrations. To create more complex haptic effects, multiple air-vortex-based actuators can be used in an array or grid configuration. By coordinating the activation of different actuators, it can become possible to generate spatial and temporal patterns of haptic feedback on the skin.

Furthermore, semi-contactless haptic stimuli can be provided by vibro-tactile actuators, such as glove-based and/or bracelet piezo actuators, and/or an exoskeleton-based actuator. In these cases, the user can wear an appropriate device and perceive a haptic stimulus that renders a sensation of touching the HSI and/or the connected device.

An embodiment of the first aspect is related to a human system interface (HSI), configured to provide the contactless haptic stimulus over a 2-dimensional area.

By providing a contactless haptic stimulus over a 2-dimensional area a 3-dimensional control space can be generated. A contactless stimulus can be provided by an array of haptic actuators, e.g. an array of ultrasound actuators. Based on an array of haptic actuators a focused contactless haptic stimulus, such as a focused ultrasonic-based haptic stimulus, can be generated. A 2-dimensional area can be aligned parallel to a visual display device, e.g. by arranging an array of contactless haptic actuators behind a visual display. A 2-dimensional area can be rectangular, round or ellipsoid. Additional or alternatively, a 2-dimensional area can have a form such that it can be placed on a device connected to the HSI, e.g., on a surface. Based on a 2-dimensional area for generating a haptic stimulus an increased control space adapted to the operational environment can be provided.

An embodiment of the first aspect is related to a human system interface (HSI), configured to: generate the control space based on the intersection of a view field of the camera and of a stimulation field of the 2-dimensional haptic stimulus area; and visualize the control space for the user.

In an intersection a user, e.g. a position of a human hand, can be registered and haptic input by a user can be measured. Furthermore, a haptic stimulus for the user can be generated in the intersection. The intersection can be displayed to the user via visual display that is capable of displaying a 3-dimensional space, e.g. a 3D-screen and/or goggles. For example, the user can be displayed a space where a camera can measure a position of the user's finger and on the same time the user can be displayed where an ultrasonic haptic display is effective. The intersection of both spaces can be visualized by a different color to indicate the control space to the user. Additionally or alternatively, a user can be informed when entering the control space by a contactless haptic stimulation.

An embodiment of the first aspect is related to a human system interface (HSI), configured to provide a contactless haptic control element generated by the contactless haptic stimulus and controllable by the haptic input.

A haptic-stimulus-driven control element can comprise any component or feature that can be used to manipulate, regulate, or manage a the HSI and/or a device connected to the HSI. A control element can enable a user to interact with and influence the behavior of the HSI and/or a connected device. Control elements can comprise switches for binary control. Knobs for multi-state or (quasi) continuous control. They can comprise buttons, sliders and/or knobs as well. Furthermore, a control element can comprise a visual keypad and/or a visual dial that can be used via haptic control. Additional or alternatively, a control element can be a contactless touchpad configured to detect a touch and/or a gestures in the area/space defined by the touchpad. By using one or more a haptic-stimulus-driven control elements a user can intuitively control the HSI or a connected device.

An embodiment of the first aspect is related to a human system interface (HSI), wherein the control element is a knob configured to be pressed, slid, and/or rotated based on the haptic input.

An embodiment of the first aspect is related to a human system interface (HSI), wherein a visual representation of the knob is presented to the user over a display and/or goggles.

Other means for providing a 3-dimensional visual stimulus are also possible, such as holographic projectors/fans, stereo-displays, and/or lightfield displays.

An embodiment of the first aspect is related to a human system interface (HSI), configured to provide a visual and/or auditive stimuli based on the operation of the knob and/or on the operation of the connected device via the haptic input.

A visual and/or auditive stimulus can confer information independent from a contactless haptic stimulus. Thereby, the contactless haptic control can be enriched by additional information, and in particular embodiments by information which is difficult to represent via a haptic stimulus. Such information can, e.g., relate to a function of a haptic control element that indicates a kind of the control element. For example, a visual stimulus can be provided to color-code a knob such that it can be differentiated from another knob.

Additionally or alternatively, a visual and/or auditive stimulus can confer information that is dependent, and in particular embodiments similar or the same, as the information provided by a haptic stimulus. Thereby, an integrated percept can be generated for a user that makes it easier for the user to perceive a controlled state. For example, if a user turns a rotating knob, an acoustic frequency sweep or an increase in volume can indicate a deviation of the knob from its zero-state. Additionally or alternatively, if the knob hits a limit a concurrent and corresponding sound can yield an integrative percept that facilitates an understanding of a user that the knob cannot be rotated any further.

An embodiment of the first aspect is related to a human system interface (HSI), configured to control the connected device directly.

Therefore, the HSI can be directly attached to the connected device. Additionally or alternatively, a haptic actuator is attached to a connected device.

In case of a direct control a contactless haptic control can be implemented without using a virtual control element generated by the haptic actuator. Moreover, the stimulus provided by the haptic actuator can directly represent a state of the connected device. For example, a microscope can be oriented via direct contactless haptic control. The haptic control then drives a motor that moves the microscope. If the microscope is moved constantly, a small haptic stimulus can be fed back, because also a direct interaction would result only in a small counter force. If the movement of the microscope is accelerated, a higher haptic stimulus can be fed back indicating the increase of inertia the user would also feel if the user would directly move the microscope.

Additionally or alternatively, a connected device can have one or more sensors to measure the parameter and/or state that is influenced by the user using the contactless haptic control. In this case, information about the parameter/state can be reflected to the HSI and the haptic stimulus fed back to a user can be based on the reflected information. Thereby, the user can obtain direct feedback of a controlled connected device.

An embodiment of the first aspect is related to a human system interface (HSI), configured to provide a control profile class that can be assigned to a parameter of a control element and/or to a parameter of a connected device.

A control profile can represent, e.g., a control of a parameter with constraints. Such a control profile can have an inertia-related control if the device is moved in free-space. Once the parameter reaches a constraint, e.g. a border of the free space, the haptic stimulus will increase. Such a profile can also be used for a virtual knob. For a proper adjustment of the control profile to the actual use case, the profile can have one or more parameters that can be adjusted, e.g. a range of a controlled parameter, the size of the haptic stimulus when a parameter constraint is reached, and/or a behavior in free space.

An embodiment of the first aspect is related to a human system interface (HSI), configured to provide contactless haptic feedback information to indicate a quality of a user interaction and/or to guide the user in providing haptic input.

A contactless haptic stimulus can also assist the user to align for proper interaction with the haptic display. Thereby, a user can become more confident in the use of a control element and the HSI becomes easier and faster to use. In particular embodiments, haptic feedback can indicate whether a user's hand is aligned correctly with a haptic control element of the HSI and/or with a connected device. Additionally or alternatively, a haptic feedback can indicate if a gesture is recognized by the HSI and/or if a gesture is not yet recognized by the HSI. Additionally or alternatively, a contactless haptic feedback can indicate if a user, e.g., the user's hand, is misaligned for and/or during the use of the contactless control.

A second aspect is related to a method for controlling a device, and in particular embodiments a medical device, comprising the steps:

obtaining a position-based information of a user;
providing a first contactless haptic stimulus to the user;
obtaining a contactless haptic input from the user;
providing a second haptic stimulus to the user depending on the haptic input; and
based on the haptic input, change a parameter of the HSI and/or provide a parameter to a device connected to the HSI.

An embodiment according to the second aspect is related to a method for controlling a device, wherein the provision of the first contactless haptic stimulus represents and/or determines an initial state of the HSI and/or of the connected device.

For example, if a microscope should be moved by contactless haptic control, the position of the user, e.g., a user's hand, when the first haptic stimulus is provided indicates the initial position of the microscope. This is independent of whether the microscope is controlled directly or via a control element. If a control element, such as a knob, is used, the initial contact can be correlated with a zero position of the control element, or with an "OFF"-position of the control element.

A third aspect is related to a medical device, and in particular embodiments a microscope, comprising an HSI according to the first aspect; and/or configured to interact with an HSI according to the first aspect; and/or to execute a method according to the second aspect.

Medical devices that can be controlled by an HSI according to the first aspect can be numerous and comprise, e.g.:

Microscopes: An interaction with a microscope over an HSI according to the first aspect can relate, e.g., to an adjustment of a focal point, to an adjustment of a visual axis, and/or to an adjustment of a visual parameter such as brightness or contrast.

Patient Monitors: These devices display real-time data on vital signs such as heart rate, blood pressure, oxygen saturation, and respiratory rate. They can feature, e.g., graphical interfaces or numeric displays together with a contactless haptic control interface according to the first aspect of this disclosure to manipulate and/or switch between the visualized data.

Infusion Pumps: Infusion pumps deliver fluids, medications, or nutrients to patients intravenously. They can be controlled with an HSI according to the first aspect, where healthcare professionals can set infusion rates, dosages, and customize delivery parameters by contactless haptic feedback.

Ventilators: Ventilators assist patients in breathing when they are unable to do so independently. They can be controlled with an HSI according to the first aspect, to enable a user to adjust ventilation parameters, monitor respiratory data, and set alarms. According to an embodiment of this disclosure, a touch screen interface of a ventilator can be implemented with contactless haptic control.

Electrocardiography (ECG/EKG) machines: These devices can record and/or display the electrical activity of a patient's heart. They can be controlled with an HSI according to the first aspect with graphical and/or haptical representations of the heart's electrical signals, allowing healthcare professionals to interpret and analyze the data. According to an embodiment of the present disclosure, an interface of an ECG/EKG-device has one or more control functions based on contactless haptic control.

Surgical Robots: Robotic-assisted surgical systems can incorporate HSIs that provide surgeons with a 3-dimensional view of the surgical site and enable precise control of robotic instruments based on an HSI according to the first aspect. Surgeons can use HSI according to the first aspect to manipulate robotic arms during minimally invasive procedures. An HSI for a surgeon that operates a surgical robot can comprise contactless haptic feedback to adjust, tune, and/or move the robot. For the latter, a HSI with contactless haptic feedback can be directly attached to the robot or used in a teleoperation system.

Magnetic Resonance Imaging (MRI) machines: MRI scanners can use contactless haptic HSIs to control the imaging parameters and visualize the captured images. Operators can adjust scan protocols, select imaging sequences, and view real-time images through interfaces which can be in particular equipped with contactless haptic control features. A contactless haptic control function can also be configured to move an MRI scanner.

An interaction of a medical device with an HSI according to the first aspect can in particular be performed over an application user interface (API). A medical device can also execute and/or be driven by a method according to the second aspect.

Further advantages and features result from the following embodiments, some of which refer to the figures. The figures do not always show the embodiments to scale. The dimensions of the various features may be enlarged or reduced, in particular for clarity of description. For this purpose the figures are at least partially schematized.

In the following description reference is made to the accompanying figures which form part of the disclosure, and which illustrate specific aspects in which the present disclosure can be understood. Identical reference signs refer to identical or at least functionally or structurally similar features.

In general, a disclosure of a described method also applies to a corresponding device (or apparatus) for carrying out the method or a corresponding system comprising one or more devices and vice versa. For example, if a specific method step is described, a corresponding device may include a feature to perform the described method step, even if that feature is not explicitly described or represented in the figure. On the other hand, if, for example, a specific device is described on the basis of functional units, a corresponding method may include one or more steps to perform the described functionality, even if such steps are not explicitly described or represented in the figures. Similarly, a system can be provided with corresponding device features or with features to perform a particular method step. The features of the various exemplary aspects and embodiments described above or below may be combined unless expressly stated otherwise.

FIG. 1 illustrates a human system interface (HSI) for contactless haptic control according to an embodiment of this disclosure. The HSI 100 comprises a visual-haptic display 102. By the visual haptic display the HSI can exert visual and haptic stimuli in a 3-dimensional space. The HSI further comprises two cameras 104, by which a 3-dimensional image of the space in front of the visual-haptic display 102 can be observed to measure a haptic input. The intersection of the space, in which the HSI can exert haptic stimuli, with the space, in which the HSI can measure a haptic input, is defined as the control space 106. The control space 106 is visualized to the user by the screen 102. Hence, the user knows when a haptic input can be provided and when not. For a contactless visual-haptic control task, a virtual button 108a, 108b is provided. The position of the virtual button 108a, 108b is determined prior to the operation. The virtual button has two zones, a "button stand-by-zone" 108a and a "button activation-zone" 108b.

The button 108a, 108b is configured to be pressed along a linear degree-of-freedom 110. It can be pressed, e.g., by a fingertip of the user's hand 112. In the "button stand-by zone" a first, weak haptic stimulus informs the user that a user's fingertip is at a position that the user can press the virtual button. The "button activation zone" provides a second haptic stimulus, which is stronger than the first haptic stimulus, to indicate that the virtual button is pressed. The first haptic feedback indicates a successful alignment of the fingertip with the virtual button. The second haptic stimulus indicates the pressing of the button. In order to provide a strong stimulus, the pressing of the button is supported by a visual indication that the button is pressed (visually the button becomes smaller in the direction indicated by degree-of-freedom 110) and by an acoustic indication (e.g. a click-sound).

Figure 2:
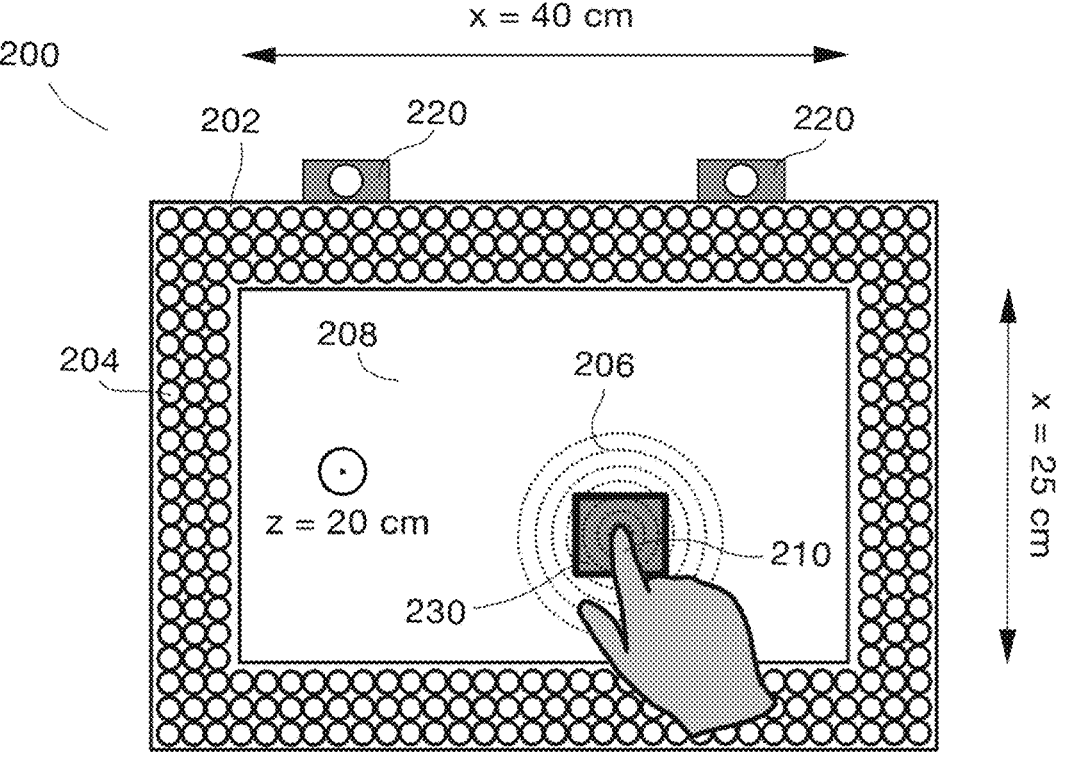
FIG. 2 illustrates a haptic actuator system together with a haptic measuring system for an HSI according to an embodiment of this present disclosure.

FIG. 2 illustrates a haptic display 200 for an HSI according to an embodiment of this disclosure. The haptic display 100 comprises a haptic actuator system 202 and a haptic measurement system 220. The haptic actuator system 202 comprises a plurality of ultrasound sources 204 that are arranged in a rectangular shape. The array of ultrasound sources 204 is configured to generate a focused ultrasound beam 206 over a rectangular space 208. The space 208 has a length of x=40 cm and a height of y=25 cm. The array of ultrasound sources generate focused beams that are effective up to a depth of z=20 cm.

The haptic measurement system 204 of the display 200 comprises two cameras capable of observing the whole area/space of the haptic actuator system 200. The haptic measurement system 204 is able to observe and measure a finger position 210 in the space in which the haptic actuator system 202 is effective. Therefore, a control space, in which a haptic input can be observed and in which a haptic stimulus can be exerted, is equal to the space in which the array of ultrasound sources is effective (40 cm×25 cm×20 cm).

The control space can be freely configured with control elements 230, such as buttons, sliders, and knobs. The control elements are generated by haptic stimuli and supported by information related to other modalities, such as acoustic and/or vision. The control elements can be used to tune parameters or functions of the HSI itself. Additionally or alternatively, a parameter or a function of a connected device can be controlled with a control element. Additionally or alternatively, gestures can be detected in the control space, which are not related to control elements. Gestures can also be used to control the HSI itself or a connected device. In a specific embodiment, the control space can be divided such that one part provides control elements. In another part of the control space, gestures are observed, and haptic feedback is provided. The haptic feedback can be related to the provided gestures and/or to a recognition of one or more gestures. For example, the haptic feedback provides the user with information if a gesture was recognized properly and/or if the haptic input by the user was provided properly. The separation of the control space with respect to control elements and gesture recognition can, additionally or alternatively, also be implemented time-dependent, such that, e.g., at first the control space performs a gesture recognition and afterwards, the control space enables control by control elements.

Figure 3:
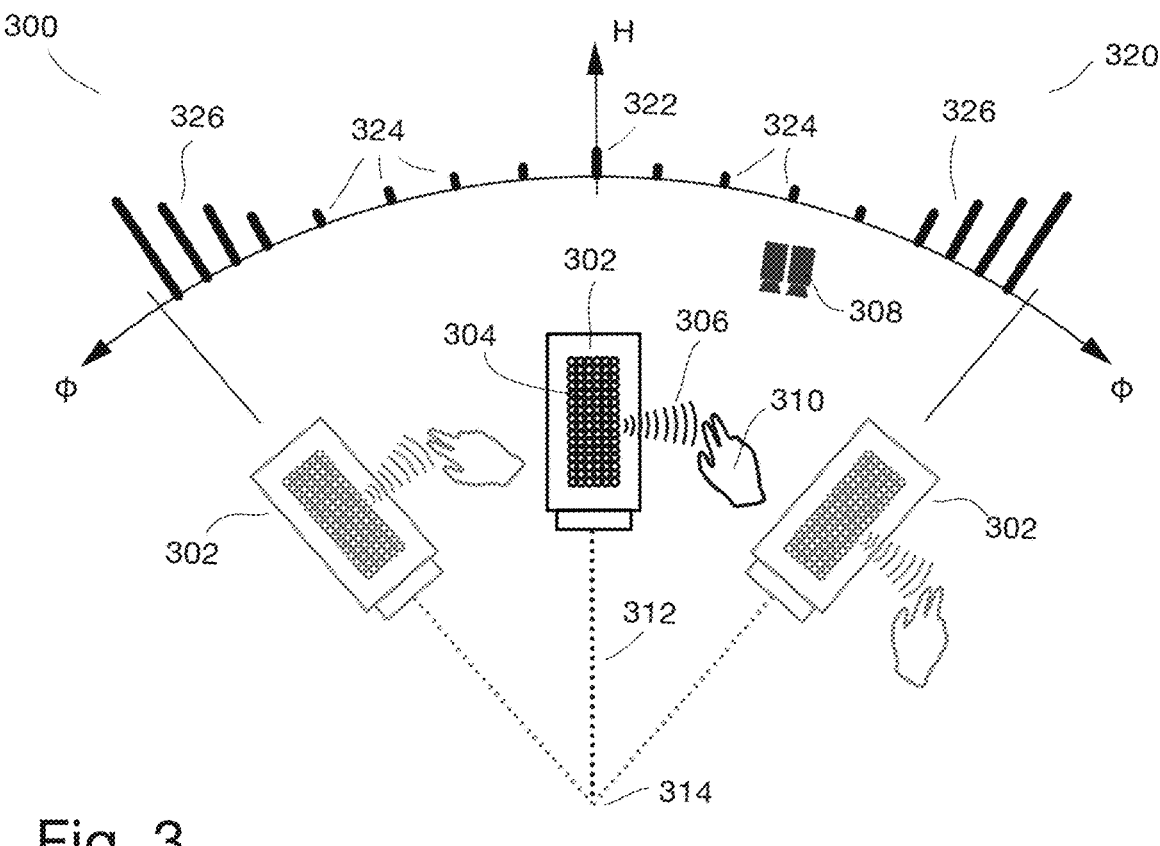
FIG. 3 illustrates a direct contactless haptic control of a connected device according to an embodiment of this present disclosure.

FIG. 3 illustrates a direct contactless haptic control 300 of a connected device 302 according to an embodiment of this disclosure. The connected device 302 to be controlled is a microscope. The illustrated direct haptic control is used to manipulate an optical axis 312 of the microscope 302, which is oriented to a position of a specimen 314, e.g. in a surgical cavity. The HSI is attached to the microscope 302. The HSI consists of an array 304 of ultrasound actuators configured to provide a haptic stimulus H via an ultrasound beam 306 to a fingertip of a human operator 306. Haptic inputs by the human operator are measured by a 3D-camera system 308.

The direct haptic control of the optical axis 312 of the microscope 302 is implemented via a haptic stimulus profile 320 that is mapped to the movable angular range of the microscope 302. The position of the user's finger is measured by a 3D-camera-system 308. Once the user's finger is registered in a control space, the HSI looks for a sliding gesture. If a sliding gesture is recognized, the HSI confirms this with a first haptic feedback signal 322 and calibrates the system such that a movement of the microscope depending on the sliding movement can start. In other words, the HSI locks-in the microscope to follow the user's hand movement. The movement of the fingertip 310 within the sliding gesture is then transformed to a movement of the microscope. Every 100 of movement of the microscope, a further haptic stimulus 324 is provided. When the microscope 302 approaches an end of its movable range, increasing haptic stimuli 326 are provided. If an end of the range is reached an additional acoustic signal is provided.

In addition to the 3D-boundaries and zones, which are fixed in space, zones and boundaries positioned relative to the microscope's position can also be useful. For example, when the hand is used to virtually move and guide the microscope, there can be defined a "virtual grabbing zone" which is always around the microscope. This means that there is an area/space where the hand can be detected as a potential control aid if it is in the area/space. In that case it can be useful to provide haptic feedback as to if the user's hand is at the correct spot.

Figure 4:
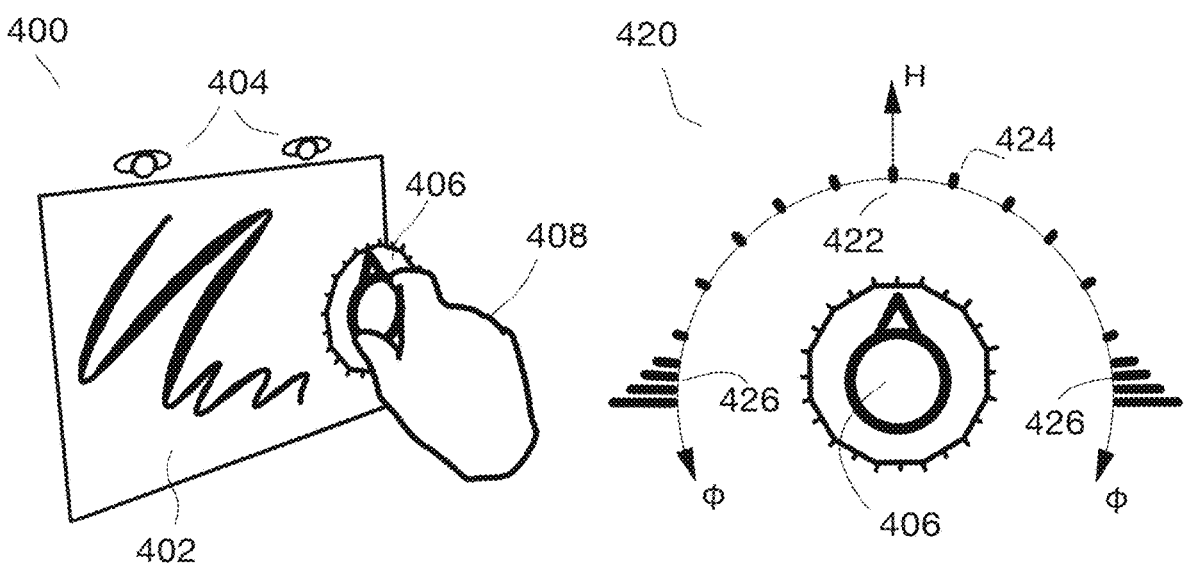
FIG. 4 illustrates a haptic control element for indirect contactless haptic control of a connected device according to an embodiment of this present disclosure.

FIG. 4 illustrates a haptic control element and its function for indirect contactless haptic control of a connected device according to an embodiment of this disclosure. On the left side of the figure an HSI 400 with a haptic control element (rotating knob) is illustrated. The HSI comprises a visual-haptic display 402 and a camera system 404 to measure haptic user input. The visual haptic display can display a knob 406 that can be rotated by a human user 408 in order to manipulate a parameter of the HSI or of a connected device.

On the right side of FIG. 4, the function of the displayed knob 406 is described. The knob 406 can be rotated to the right and to the left. Depending on the rotation angle (p, which is correlated to the parameter to be manipulated, a haptic stimulus (H) is provided to the user. The stimulus is built to resemble the behavior of a mechanical rotating knob. While rotating the knob the user gets haptic stimuli 424 to indicate how far he has turned the knob. Confirmation of the rotation is provided by discrete haptic clicks resembling a real rotation knob. Confirmation that the knob is at the zero position is displayed by a larger haptic click. This is also displayed to the user visually over a 3D-screen of the visual-haptic-display 402. If the knob is rotated near to its end positions, the user receives increased haptic feedback to inform the user about the end of the rotation range. In other words, the HSI indicates that the end of the rotation range is being reached by offering a gradually increasing haptic intensity near the range end. By the haptic feedback the user can perceive the position of the knob even without looking at the visual display. This can facilitate in particular medical procedures.

Figures 5, 6:
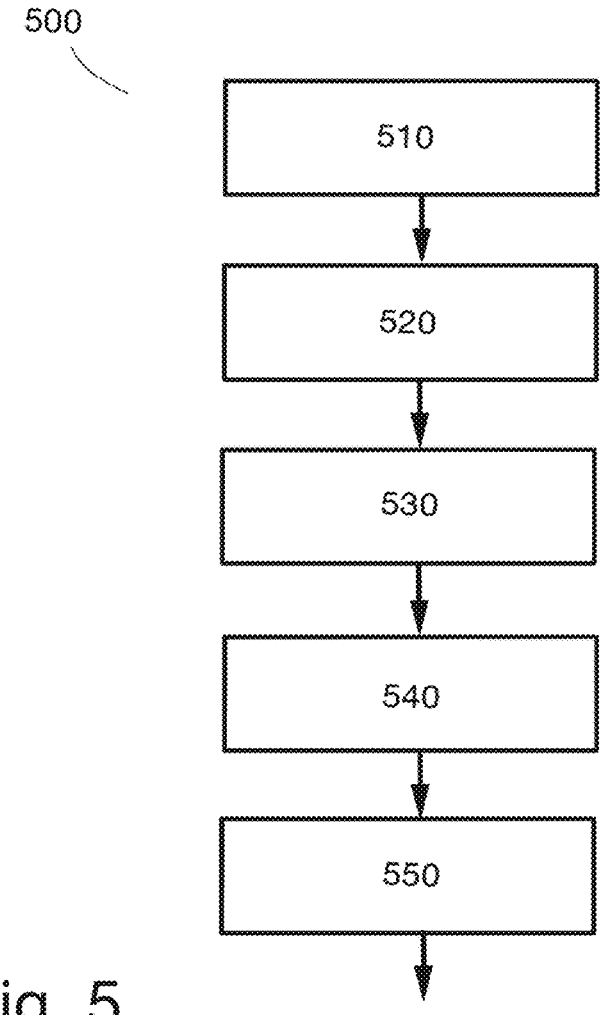
FIG. 5 illustrates a method for controlling a connected device with an HSI according to an embodiment of this present disclosure.
FIG. 6 illustrates a microscope system to be controlled by an HSI according to an embodiment of this present disclosure.

FIG. 5 illustrates a method for controlling a connected device with an HSI according to an embodiment of this disclosure.

In step 510, when a user's hand moves near to the microscope and enters a predefined control space, the microscope locks and follows the user's hand. Therefore, the HSI needs to obtain the position of the user's hand. This can be done, e.g. by a position measurement system, such as a camera, attached or connected to the HSI.

After having registered the user's hand in the control space, in step 520, a first contactless haptic stimulus is provided to the user. The first contactless haptic stimulus indicates to the user that the HSI has assigned the user's hand position to controlling a parameter. This parameter can either be a parameter of the HSI itself and/or a parameter of a device connected to the HSI.

In a subsequent step 530, a haptic input from the user is measured by the HSI. By this measurement the control input by the user is recorded. Parallelly to the recording of the user's control input, in a further step 540, a second haptic stimulus is provided to the user. This stimulus can be a static stimulus, which is quasi-independent of the user's input, and which only informs the user about a correct alignment of the user's input. Additionally or alternatively, the stimulus can vary depending on the movement of the user's hand. Thereby complex feedback can be provided to the user, as described above.

After recording of the haptic input, in step 550, a parameter of the HSI and/or of a connected device is adapted in correlation with the haptic input.

The haptic feedback can serve a as guide for the alignment and as confirmation of the user's actions. A further way to describe the concept of programming the haptic feedback is to define 3D-boundaries and/or zones which define the type of haptic feedback. In the examples above virtual boundaries can be derived by a microscope's physical limitations, i.e. the microscope arm cannot move beyond, or the limitations of a virtual control element. Alternatively, virtual boundaries can be determined by other limitations such as the alignment with a surgical cavity, e.g., if a microscope is restricted within angles that allow to look in the surgical cavity.

Some embodiments relate to a microscope comprising a system as described in connection with one or more of the FIGS. 1 to 5. Alternatively, a microscope may be part of or connected to a system as described in connection with one or more of the FIGS. 1 to 5. FIG. 6 shows a schematic illustration of a system 600 configured to perform a method described herein. The system 600 comprises a microscope 610 and a computer system 620. The microscope 610 is configured to take images and is connected to the computer system 620. The computer system 620 is configured to execute at least a part of a method described herein. The computer system 620 may be configured to execute a machine learning algorithm. The computer system 620 and microscope 610 may be separate entities but can also be integrated together in one common housing. The computer system 620 may be part of a central processing system of the microscope 610 and/or the computer system 620 may be part of a subcomponent of the microscope 610, such as a sensor, an actor, a camera or an illumination unit, etc. of the microscope 610.

The computer system 620 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 620 may comprise any circuit or combination of circuits. In one embodiment, the computer system 620 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 620 may be a custom circuit, an application-specific integrated circuit (ASiC), or the like, such as, for example, one or more circuits (such as a communication circuit) for use in wireless devices like mobile telephones, tablet computers, laptop computers, two-way radios, and similar electronic systems. The computer system 620 may include one or more storage devices, which may include one or more memory elements suitable to the particular application, such as a main memory in the form of random-access memory (RAM), one or more hard drives, and/or one or more drives that handle removable media such as compact disks (CD), flash memory cards, digital video disk (DVD), and the like. The computer system 620 may also include a display device, one or more speakers, and a keyboard and/or controller, which can include a mouse, trackball, touch screen, voice-recognition device, or any other device that permits a system user to input information into and receive information from the computer system 620.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 HSI
102 visual-haptic display
104 cameras
106 control space
108a virtual button stand-by-zone
108b virtual button activation-zone
110 button degree-of-freedom
112 user hand
200 haptic display
202 haptic actuator system
204 ultrasound source
206 ultrasound beam
208 space for ultrasound beam
210 finger position
220 haptic measurement system
230 control element
300 contactless haptic control
302 connected device
304 array of ultrasound actuators
306 human operator
308 3D-camera system
312 optical axis
314 specimen
320 haptic stimulus profile
322 haptic start signal
324 movement signal
326 boundary haptic stimuli
400 HSI
402 visual haptic display
404 camera system
406 rotating knob
408 user
424 haptic stimuli signals
510 registering a user
520 providing first haptic stimulus
530 measuring haptic input
540 providing second haptic input
550 adapt parameter
600 system
610 microscope
620 computer system

The invention claimed is:

1. A human system interface (HSI) for contactlessly controlling a device for a medical procedure, the HSI configured to at least:

generate a control space;

provide a contactless haptic control element as a visual representation on a display and/or goggles, wherein the contactless haptic control element has a stand-by-zone and an activation zone;

measure a first position of a hand of a user in the control space;

provide a first contactless haptic stimulus in the control space to the user based on the first position being in the stand-by-zone so as to inform the user that the hand is at a predetermined position to provide a contactless haptic input;

measure the contactless haptic input from the user in the control space by measuring a second position of the hand of the user;

provide a second haptic stimulus different from the first haptic stimulus to the user based on the second position being in the activation-zone, indicating that the contactless haptic input has been actuated; and based on the contactless haptic input, change a parameter of the HSI and/or provide a parameter to the device connected to the HSI.

2. The HSI according to claim 1, comprising one or more of the following sensors to measure the contactless haptic input:

a camera;

an accelerometer; and/or an optical position tracker.

3. The HSI according to claim 1, comprising one or more of the following actuators to provide the first contactless haptic stimulus in the control space to the user:

an ultrasound-based actuator;

a laser-based actuator;

a magnetic-field-based actuator;

an air-vortex-based actuator;

a glove-based actuator;

an exoskeleton-based actuator; and/or a vibro-tactile actuator.

4. The HSI according to claim 1, further configured to provide the first contactless haptic stimulus over a 2-dimensional stimulus area.

5. The HSI according to claim 4, further configured to:

generate the control space based on an intersection of a view field of a camera and of a stimulation field of the 2-dimensional stimulus area; and visualize the control space for the user.

6. The HSI according to claim 1, wherein the contactless haptic control element is a knob configured to be pressed, slid, and/or rotated based on the contactless haptic input.

7. The HSI according to claim 1, further configured to provide a visual and/or auditory stimuli based on an operation of a knob and/or based on an operation of the device via the contactless haptic input.

8. The HSI according to claim 1, further configured to control the device directly.

9. The HSI according to claim 1, further configured to provide a control profile class that is capable of being assigned to a parameter of the contactless haptic control element and/or to a parameter of the device.

10. The HSI according to claim 1, further configured to provide a contactless haptic feedback information to indicate a quality of a user interaction and/or to guide the user in providing the contactless haptic input.

11. A method for controlling a device within a medical procedure using a human system interface (HIS), the method comprising:

providing a control space;

provide a contactless haptic control element as a visual representation on a display and/or goggles, wherein the contactless haptic control element has a stand-by-zone and an activation zone;

determining a first position of a hand of a user in the control space;

providing a first contactless haptic stimulus to the user so as to inform the user based on the first position being in the stand-by-zone so as to inform the user that the hand is at a predetermined position to provide a contactless haptic input;

receiving and measuring the contactless haptic input from the user in the control space by measuring a second position of the hand of the user;

providing a second haptic stimulus different from the first haptic stimulus to the user based on the second position being in the activation-zone, indicating that the haptic input has been actuated; and based on the contactless haptic input, change a parameter of the HSI and/or provide a parameter to the device connected to the HSI.

12. A medical device comprising an HSI according to claim 1.

13. The medical device of claim 12, wherein the medical device is a microscope.

14. A medical device configured to interact with the HSI according to claim 1.

15. A medical device configured to execute the method of claim 11.

\* \* \* \* \*